(12) United States Patent
Heikkilä

(10) Patent No.: US 7,424,061 B2
(45) Date of Patent: Sep. 9, 2008

(54) DATA TRANSFER METHOD AND SYSTEM

(75) Inventor: Markku Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 514 days.

(21) Appl. No.: 10/386,250

(22) Filed: Mar. 11, 2003

(65) Prior Publication Data

US 2003/0174780 A1    Sep. 18, 2003

(30) Foreign Application Priority Data

Mar. 12, 2002   (FI)   .................................. 20020461

(51) Int. Cl.
    *H04L 27/00*   (2006.01)
(52) U.S. Cl. .................... 375/259; 375/346; 375/347
(58) Field of Classification Search ................ 375/259, 375/346–350
    See application file for complete search history.

(56) References Cited

U.S. PATENT DOCUMENTS

| | | | |
|---|---|---|---|
| 5,815,801 A * | 9/1998 | Hamalainen et al. ........ 455/63.1 |
| 5,832,387 A | 11/1998 | Bae et al. | |
| 6,044,110 A | 3/2000 | Yiu | |
| 6,130,916 A * | 10/2000 | Thomson ..................... 375/285 |
| 6,408,022 B1 * | 6/2002 | Fertner ......................... 375/230 |
| 6,473,467 B1 * | 10/2002 | Wallace et al. ............... 375/267 |
| 2001/0019577 A1 | 9/2001 | Ha | |
| 2003/0118177 A1 * | 6/2003 | Karakas et al. ......... 379/406.01 |

FOREIGN PATENT DOCUMENTS

| | | |
|---|---|---|
| CA | 2153641 | 1/1997 |
| WO | WO 01/54368 | 7/2001 |

OTHER PUBLICATIONS

Esmailzaheh et al., "Pre-Rake Diversity Combination for Direct Sequence Spread Spectrum Communications Systems", Proceedings of the International Conference on Communications, Geneva, IEEE, May 23, 1993, pp. 463-467.

Maeda et al., "A Delay Profile Information Based Subcarrier Power Control Combined with a Partial Non-Power Allocation Technique for OFDM/FOD Systems", IEEE, vo. 2, Sep. 18, 2000, pp. 1380-1384.

Su et al., "Power Allocation and Control for Multicarrier Systems with Soft Decoding", IEEE journal on selected areas in communications, IEEE, Inc., New York, vol. 17, No. 10, Oct. 19, 1999, pp. 1753-1769.

* cited by examiner

Primary Examiner—Curtis B Odom
(74) Attorney, Agent, or Firm—Hollingsworth & Funk, LLC

(57) ABSTRACT

The invention relates to a data transfer method and a data transfer system between a first and a second transceiver, the data transfer comprising transmitting a data signal from the first transceiver to the second transceiver in a broadband channel, measuring, at the second transceiver, the frequency response of the channel and the frequency response of the data signal from the received signal. Measurement results are compared with each other and a need for change in the frequency response of the data signal is determined on the basis of the comparison. Information about the need for change is transmitted to the first transceiver and the frequency response of the data signal to be transmitted is modified at the first transceiver on the basis of the information.

20 Claims, 4 Drawing Sheets

DATA TRANSFER METHOD AND SYSTEM

FIELD

Figure 1:
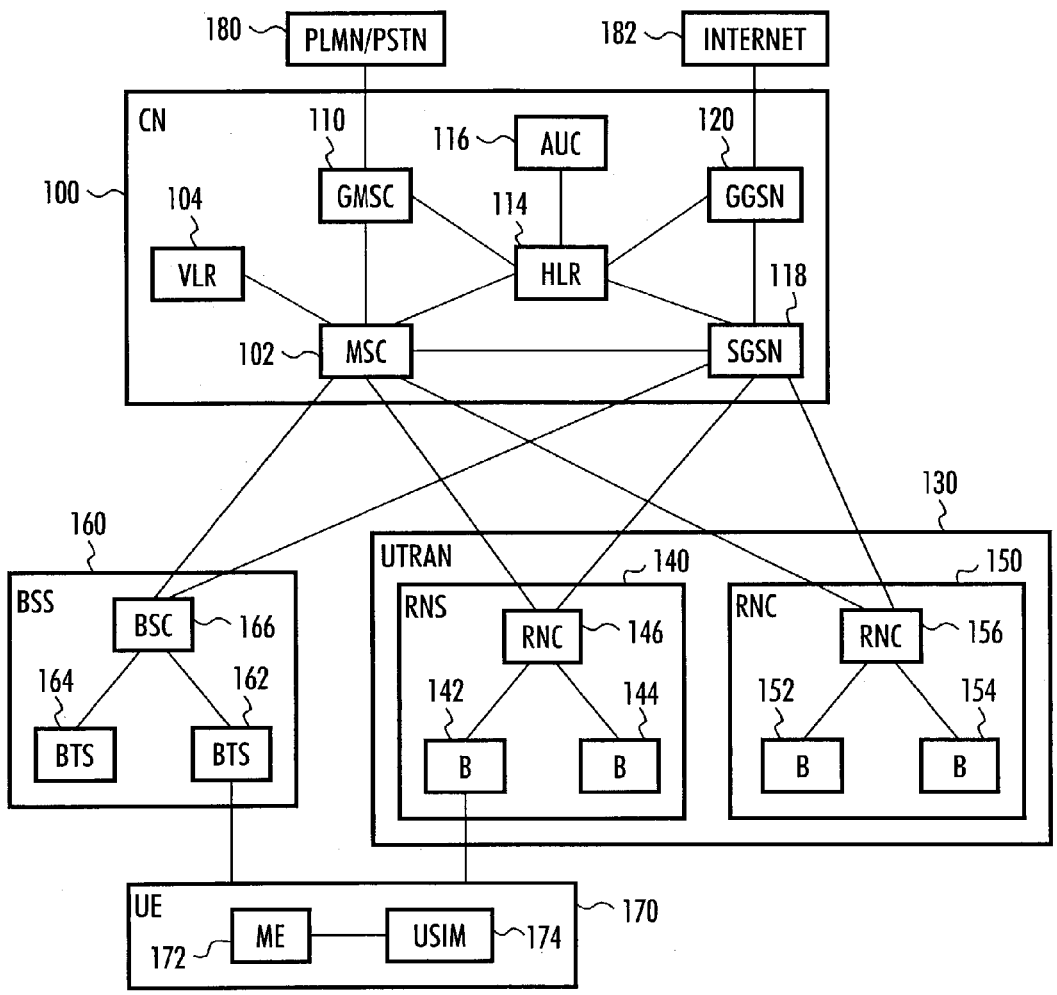

The invention relates to a data transfer method and a data transfer system wherein a broadband transport channel is used.

BACKGROUND

Data transfer systems have been developed recently wherein a rather broadband transport channel is used for data transfer. In radio systems in particular, the trend seems to be shifting away from the use of a narrowband channel towards broadband channels. The first mobile telephone systems, for example, used narrowband channels but both a so-called third generation UMTS system being developed and a fourth generation system already in view use a broadband transport channel.

The use of a broadband channel provides several advantages over narrowband systems. Broadband channels enable higher capacity to be achieved more easily. In addition, it is impossible that a signal could fade completely in a broadband channel, as is the case in a narrowband channel since in a narrow frequency band fading often occurs simultaneously. Fading is caused by multipath signal propagation when a signal propagates from a transmitter to a receiver. The impulse response of a narrowband channel is thus a single impulse while the frequency response, i.e. the attenuation of a signal propagated through a channel as a function of frequency, is a constant. The frequency response of a broadband channel is not a constant because of the broad band but because a signal attenuates differently in different frequency bands. The channel can thus be considered to be frequency selective. A discrete Fourier transform (DTF) of the impulse response of the channel is no longer constant but different frequencies attenuate differently.

As data transfer rates increase, the need for reliable data transfer and as efficient utilization of the channel used as possible is constantly on the increase. In the known broadband systems, the transmission power is evenly distributed over the frequency band of the channel used. In order to compensate for fading, a solution has previously been used in an orthogonal frequency division multiple access OFDMA connection, wherein differently faded frequency bands are amplified in different ways.

BRIEF DESCRIPTION

An object of the invention is thus to implement a method and an apparatus implementing the method so as to enable the capacity of a frequency band used to be efficiently utilized also in erroneous situations. This is achieved by a data transfer method between a first and a second transceiver, the data transfer comprising transmitting a data signal from the first transceiver to the second transceiver in a broadband channel, measuring, at the second transceiver, the frequency response of the channel from the received signal, transmitting information about the frequency response to the first transceiver, modifying, at the first transceiver, the frequency response of the data signal to be transmitted on the basis of the information.

The invention further relates to a data transfer method between a first transceiver and a second transceiver, the data transfer comprising transmitting a data signal from the first transceiver to the second transceiver in a broadband channel, measuring, at the second transceiver, the frequency response of the channel and the frequency response of the data signal from the received signal, comparing measurement results with each other, determining a need to change the frequency response of the data signal on the basis of the comparison, transmitting information about the need for change to the first transceiver, modifying, at the first transceiver, the frequency response of the data signal to be transmitted on the basis of the information.

The invention also relates to a data transfer system comprising a first and a second transceiver, wherein the first transceiver is arranged to transmit a data signal to the second transceiver in a broadband channel, and the second transceiver is arranged to receive the signal and measure the frequency response of the channel from the received signal, the second transceiver is arranged to transmit information about the measured frequency response to the first transceiver, the first transceiver is arranged to modify the frequency response of the data signal to be transmitted on the basis of the information.

The invention further relates to data transfer system comprising a first and a second transceiver, wherein the first transceiver is arranged to transmit a data signal to the second transceiver in a broadband channel, and the second transceiver is arranged to receive the signal and measure the frequency response of the channel and the frequency response of the data signal from the received signal, the second transceiver is arranged to compare measurement results with each other, determine a need for change in the frequency response of the data signal on the basis of the comparison, transmit information about the need for change to the first transceiver, and the first transceiver is arranged to modify the frequency response of the data signal to be transmitted on the basis of the information.

Preferred embodiments of the invention are described in the dependent claims.

In an embodiment of the invention, a broadband data signal is thus transmitted from a transmitter to a receiver. At the receiver, the frequency response of the channel is measured from the received signal. Information about the measured frequency response is transmitted to the transmitter. On the basis of this information, the transmitter modifies the frequency response of the data signal to be transmitted. In the wide frequency band used, the transmission power is adjusted by using different transmission power in different parts of the frequency band.

In another embodiment of the invention, the frequency response of the channel and the frequency response of the data signal are measured from the received signal at the receiver. At the receiver, the measured response of the data signal is compared with the desired frequency response of the data signal determined on the basis of the response of the channel, and a need for change in the frequency response of the data signal is determined. Information about the determined need for change is transmitted to the transmitter. On the basis of this information, the transmitter modifies the frequency response of the data signal to be transmitted. In the wide frequency band used, the transmission power is adjusted by using different transmission power in different parts of the frequency band.

The solution of the invention provides several advantages. When the frequency band used is a wide one, the signal typically attenuates differently in different parts of the frequency band. The frequency response of the channel is measured at the receiver; this enables the way in which the signal has been attenuated in the different parts of the frequency band to be found out. On the basis of this information, it is possible at the receiver e.g. to increase transmission power in the part of the frequency band wherein signal attenuation has not been strong and, correspondingly, to decrease transmission power in parts wherein the signal has been attenuated. This enables the characteristics of the frequency band to be utilized efficiently. The solution enables a higher system capacity (bits/s/Hz), improved signal strength or a higher transmission capacity for a single user to be achieved.

In an embodiment, the frequency response is measured at certain points of a frequency band. At the transmitter, similar adjustments are carried out at the respective points. The number of points and the distance therebetween in the frequency band can be chosen according to the width of the frequency band used. This enables the implementation to be simplified but still an adequately efficient transmission power control to be achieved.

When the invention is applied to a CDMA system wherein a common pilot signal is transmitted, the common pilot signal is transmitted such that its power is distributed evenly over the entire frequency band. This enables the frequency response of the channel to be estimated at the receiver by means of the common pilot signal. Next, the frequency response of the data signal is determined at the receiver, and then, by comparing the frequency response determined for the data signal with the frequency response of the common pilot signal, the need for change in the frequency response to be used in the transmission of the data signal can be determined.

LIST OF DRAWINGS

Figure 2:
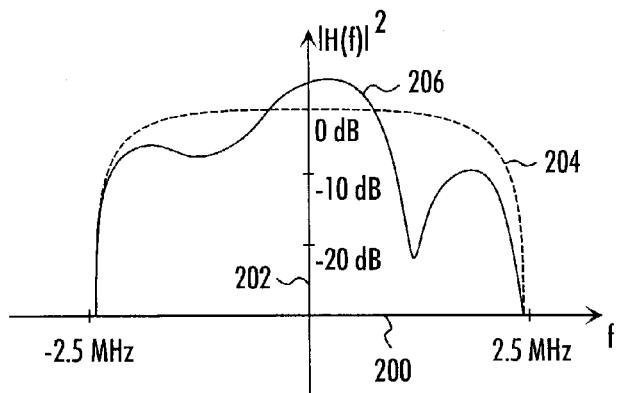
Figure 3A:
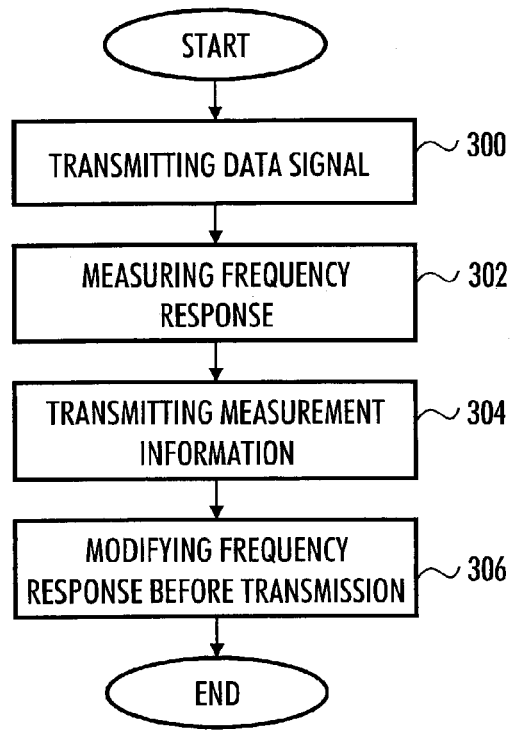
Figure 3B:
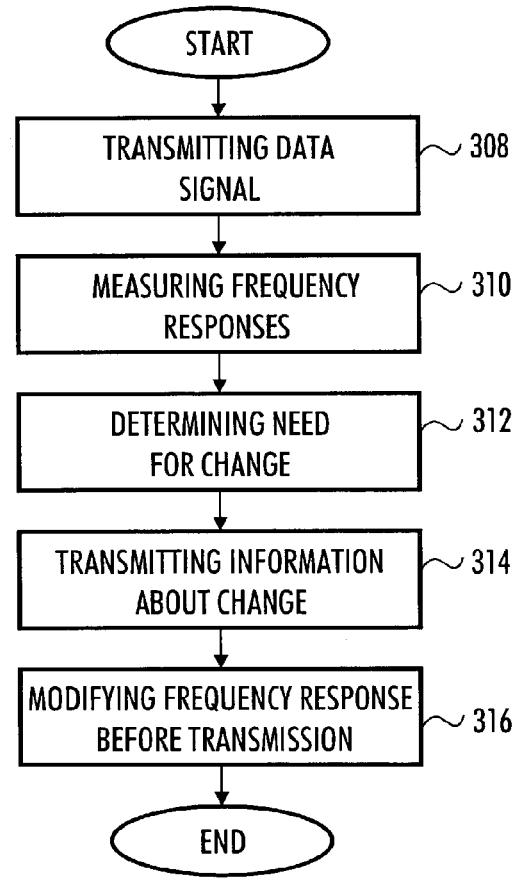
Figure 4:
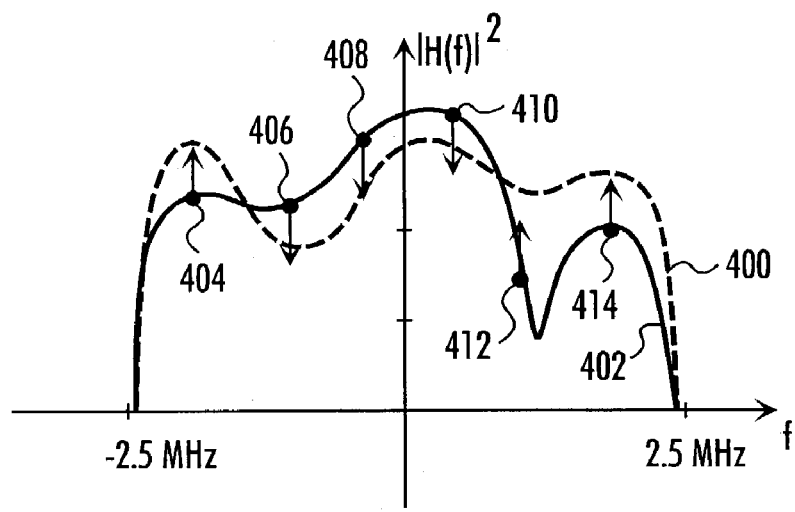
Figure 5:
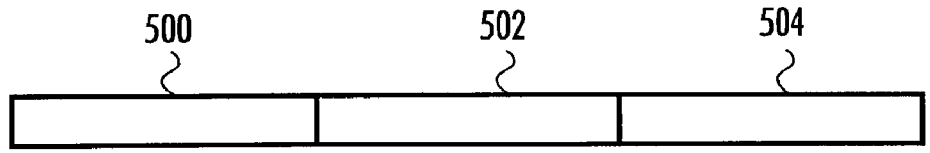
Figure 6:
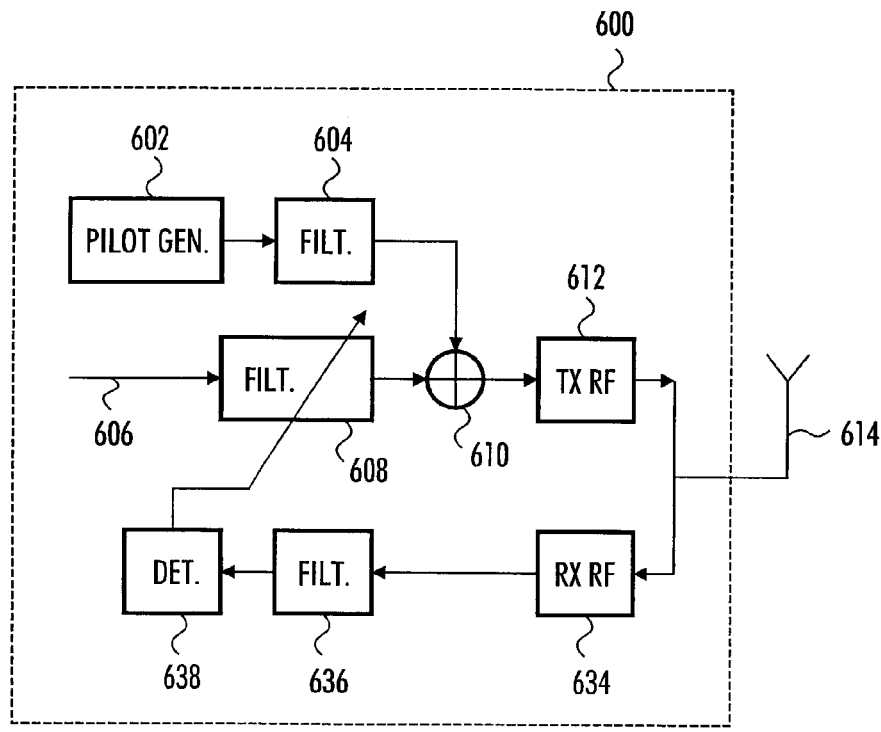
Figure 6:
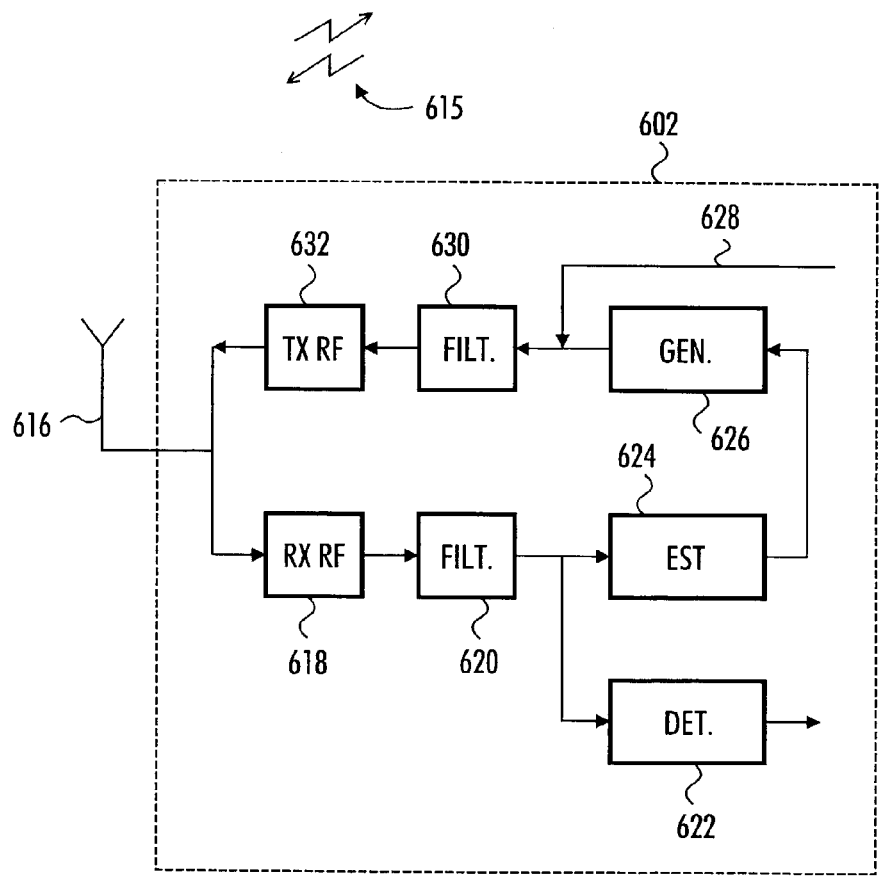

The invention is now described in closer detail in connection with the preferred embodiments and with reference to the accompanying drawings, in which FIG. 1 is a simplified block diagram showing the structure of radio systems, FIG. 2 shows a frequency response, FIGS. 3A and 3B are flow diagrams showing preferred embodiments, FIG. 4 illustrates a preferred embodiment, FIG. 5 illustrates data transfer utilizing frames, FIG. 6 shows an example of a first and a second transceiver, and FIG. 7 illustrates the operation of a pulse shaper.

DESCRIPTION OF EMBODIMENTS

The preferred embodiments of the invention can preferably be applied to systems wherein the frequency response of the frequency band used for data transfer is not constant. Such radio systems include e.g. systems called GSM, GPRS, UMTS, CDMA2000 (Code Division Multiple Access), and other broadband systems. Hereinafter, the preferred embodiments will be described using two systems, i.e. the GPRS and UMTS, as examples without, however, being restricted thereto, as is obvious to one skilled in the art.

Let us start by explaining some of the terminology used in the application. A radio system is herein used to refer to a Radio Access Technology (RAT) layer of telecommunication systems, which belongs to a so-called Access Stratum (AS), above which the telecommunication systems include a Non Access Stratum (NAS), which uses services of separate radio systems.

Let us view FIG. 1 illustrating the structure of radio systems. FIG. 1 is a simplified block diagram which, on a network element level, describes the most important parts of the radio systems and the interfaces therebetween. Being generally known, the structure and functions of the network elements will not be described in detail herein.

In FIG. 1, a Core Network (CN) 100 represents the non-access stratum of a telecommunication system. A first radio system, i.e. a radio access network 130, and a second radio system, i.e. a Base Station System (BSS) 160, represent the radio systems. The figure further shows user equipment (UE) 170. The term UTRAN is short for UMTS Terrestrial Radio Access Network, i.e. the radio access network 130 is implemented by Wide-band Code Division Multiple Access (WCDMA) technology. The base station system 160 is implemented by Time Division Multiple Access (TDMA) technology.

On a general level, the radio system can also be defined to include user equipment, which is also known as a subscriber terminal and mobile phone, for instance, and a network part, which includes a radio access network or a base station system of the fixed infrastructure of the radio system.

The structure of the core network 100 corresponds to a combined structure of the GSM and GPRS systems. The GSM network elements are responsible for establishing circuit-switched connections, and the GPRS network elements are responsible for establishing packet-switched connections; some of the network elements are, however, included in both systems.

A Mobile Services Switching Center (MSC) 102 is the center point of the circuit-switched side of the core network 100. The same mobile services switching center 102 can be used to serve the connections of both the radio access network 130 and the base station system 160. The tasks of the mobile services switching center 102 include: switching, paging, user equipment location registration, handover management, collection of subscriber billing information, encryption parameter management, frequency allocation management, and echo cancellation. The number of mobile services switching centers 102 may vary: a small network operator may only have one mobile services switching center 102 but large core networks 100 may have several ones.

Large core networks 100 may have a separate Gateway Mobile Services Switching Center (GMSC) 110, which is responsible for circuit-switched connections between the core network 100 and external networks 180. The gateway mobile services switching center 110 is located between the mobile services switching centers 102 and the external networks 180. An external network 180 can, for instance, be a Public Land Mobile Network (PLMN) or a Public Switched Telephone Network (PSTN).

A Home Location Register (HLR) 114 comprises a permanent subscriber register, i.e. the following information, for instance: an International Mobile Subscriber Identity (IMSI), a Mobile Subscriber ISDN number (MSISDN), an authentication key, and when the radio system supports GPRS, a Packet Data Protocol (PDP) address.

A Visitor Location Register (VLR) 104 contains roaming information on user equipment 170 in the area of the mobile services switching center 102. The visitor location register 104 comprises almost the same information as the home location register 114, but in the visitor location register 104, the information is kept only temporarily.

An Authentication Center (AuC) 116 is always physically located in the same place as the home location register 114, and it comprises an Individual Subscriber Authentication Key (Ki), a Ciphering Key (CK) and a corresponding IMSI.

The network elements shown in FIG. 1 are functional entities whose physical implementation may vary. Usually, the mobile services switching center 102 and the visitor location register 104 constitute one physical device while the home location register 114 and the authentication center 116 constitute another.

A Serving GPRS Support Node (SGSN) 118 is the center point of the packet-switched side of the core network 100. The main task of the serving GPRS support node 118 is to transmit and receive packets together with the user equipment 170 supporting packet-switched transmission by using the radio access network 130 or the base station system 160. The serving GPRS support node 118 contains subscriber and location information concerning the user equipment 170.

A Gateway GPRS Support Node (GGSN) 120 is the packet-switched side counterpart to the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In our example, external networks 182 are represented by the Internet.

The first radio system, i.e. the radio access network 130, comprises Radio Network Subsystems (RNS) 140, 150. Each radio network subsystem 140, 150 comprises Radio Network Controllers (RNC) 146, 156 and nodes B 142, 144, 152, 154. Node B is a rather abstract concept; the term 'base transceiver station' is often used instead.

The radio network controller 146 controls nodes B 142, 144 subordinate thereto. In principle, the aim is that the devices implementing a radio path and the related functions are located at nodes B 142, 144 while control devices are located at the radio network controller 146.

The radio network controller 146 is responsible for the following tasks, for instance: radio resource management of nodes B 142, 144, intercell handovers, frequency control, i.e. frequency allocation to nodes B 142, 144, management of frequency hopping sequences, time delay measurement on the uplink, implementation of the operation and maintenance interface, and power control.

Node B 142, 144 comprises one or more transceivers to implement a WCDMA radio interface. Typically, node B serves one cell but a solution is also possible wherein node B serves several sectored cells. The diameter of a cell may range between few meters and dozens of kilometers. The tasks of node B include: calculation of timing advance (TA), uplink measurements, channel coding, encryption, decryption, and frequency hopping.

The second radio system, i.e. the base station system 160, comprises a Base Station Controller (BSC) 166 and a plurality of Base Transceiver Stations (BTS) 162, 164. The base station controller 166 controls a base transceiver station 162, 164. In principle, the aim is that the devices implementing a radio path and the related functions are located at the base transceiver station 162, 164 while control devices are located at the base station controller 166. The base station controller 166 is responsible for substantially the same tasks as the radio network controller.

The base transceiver station 162, 164 comprises at least one transceiver, which implements one carrier, i.e. eight time slots, i.e. eight physical channels. Typically, one base transceiver station 162, 164 serves one cell, but a solution is also possible wherein one base transceiver station 162, 164 serves several sectored cells. The base transceiver station 162, 164 is also considered to comprise a transcoder to carry out the conversion between a speech encoding format used in a telephone network and a speech encoding format used in a public telephone network. In practice, however, the transcoder usually resides at the mobile services switching centre 102. The tasks of the base transceiver station 162, 164 are similar to those of node B.

The user equipment 170 comprises two parts: Mobile Equipment (ME) 172 and a UMTS Subscriber Identity Module (USIM) 174. The user equipment 170 includes at least one transceiver to implement a radio connection to the radio access network 130 or the base station system 160. The user equipment 170 may comprise at least two different subscriber authentication units. The user equipment 170 further comprises an antenna, a user interface and a battery. Today, different types of user equipment 170 exist, for instance portable equipment and equipment installed in vehicles.

The USIM 174 comprises user-related information and information related to information security in particular, for instance an encryption algorithm.

FIG. 2 illustrates an example of frequency-selective attenuation of a signal in a broadband channel by means of the frequency response of the signal. A frequency f is shown along the horizontal axis 200, while a Fourier transform H(f) is shown along the vertical axis 202. The width of the band used in the example of the figure is 5 MHz. The broken line 204 describes the response of a flat channel, the response thus being uniform over the entire band and only being modified by transmit and receive filters. The solid line 206 describes the response in a frequency selective channel. The response varies considerably as a function of frequency. An advantage of the broadband channel is thus that frequency diversity can be achieved since all frequencies do not usually attenuate simultaneously, which means that a part of a signal will always arrive at a receiver.

In Frequency Division Duplex (FDD) systems wherein different frequencies include different directions of transmission, a transmitter has no knowledge of the characteristics of the channel used for the transmission without feedback from a receiver. In an embodiment of the invention, at a transceiver receiving a data signal, the frequency response of the channel is measured from the received signal. Information about the measured frequency response is transmitted to the transceiver transmitting the data signal, and on the basis of this information, the transmitting transceiver modifies the frequency response of the data signal to be transmitted. As a result of the modification, different parts of the frequency band use different transmission power. This is to utilize the parts of the frequency band wherein attenuation is low.

A preferred embodiment of the invention is illustrated in FIG. 3A. In step 300, a first transceiver transmits a broadband data signal to a second transceiver. In step 302, the second transceiver measures the frequency response of the channel from the received signal. In step 304, the second transceiver transmits information about the frequency response to the first transceiver. In step 306, the first transceiver modifies the frequency response of the data signal to be transmitted on the basis of the information.

Another preferred embodiment of the invention is illustrated in FIG. 3B. In step 308, a first transceiver transmits a broadband data signal to a second transceiver. In step 310, the second transceiver measures the frequency response of the channel and the frequency response of the data signal from the received signal. In step 312, on the basis of the measurements, the second transceiver determines a need for change in the frequency response of the data signal. In step 314, the second transceiver transmits information about the need for change to the first transceiver. In step 316, the first transceiver modifies the frequency response of the data signal to be transmitted on the basis of the information.

FIG. 4 illustrates an embodiment. The vertical and horizontal axes are similar to those in FIG. 2. A transceiver receiving a data signal compares the frequency response of the received data signal with the optimal frequency response, and indicates a necessary correction to the receiver. The frequency response can be measured and modified at certain points of the frequency band. In FIG. 4, the optimal frequency response is illustrated by the broken line 400. The frequency response of the received data signal is illustrated by the solid line 402. The frequency response is measured at certain frequencies that are described by black dots 404 to 414 in the figure. The optimal frequency response can be determined at the same frequencies. The receiving transceiver can thus determine the frequency response of the received signal and the deviations in the optimal frequency response, and inform the transmitter about how the response of the data signal to be transmitted should be corrected in order to achieve the optimal frequency response. In FIG. 4, the need for correction is designated by arrows. The receiving transceiver thus determines a value for each dot 404 to 414 by which the transmission power should be either increased or decreased.

Examine a possible way to determine the optimal frequency response. A radio channel is herein depicted by a channel impulse response h(t) or by a rather discrete, i.e. sampled, form h(i) thereof. It is assumed herein that the impulse response of the channel may include the effect of the radio frequency or baseband filters used in the transmission and reception of a signal in order to restrict the band. In addition to the impulse response of the channel, a Fourier transform of the h(t) or a discrete Fourier transform (DFT) of the h(i) can be processed, which gives the description of the channel in the frequency domain. In the following, the DFT of the h(i) will be processed, which is indicated by H(k), wherein k is a frequency variable. Owing to the nature of the DFT, the frequency domain presentation has a certain accuracy. Each index k corresponds with one frequency subband whose bandwidth is $\Delta W$, and h(k) is a complex-value coefficient representing the phase and amplification of the channel in the particular subband. When the width of the frequency band used is W, the number K of subbands is $\lceil W/\Delta W \rceil$. The number of subbands thus depends on the accuracy of the DFT.

The capacity (bits per second) of a channel whose width is W is the sum of the capacities of its subbands $\Delta W$. The number of subbands being K, the total capacity is $$C = \sum_k C_k = \Delta W \sum_k \log_2\left[1 + \frac{P(k)|H(k)|^2}{N(k)}\right]$$
$$= \Delta W \sum_k \log_2[1 + \gamma(k)|H(k)|^2]$$

wherein P(k) and n(k) are the signal and noise power density (W/Hz) in the subband k. The signal-to-noise ratio at a certain frequency is $$\gamma(k) = \frac{|H(k)|^2}{N(k)}.$$

Since the total transmission power is assumed to be restricted to a value P, the problem is a power-restricted optimization problem:

$$\begin{cases} C = \Delta W \sum_k \log_2[1 + \gamma(k)P(k)] \\ \sum_k P(k)\Delta W = P \end{cases}$$

wherein the capacity C is to be maximized in relation to the term P(k). It is to be noted herein that the total transmission power P may be subject to power control, as in WCDMA systems. In the present example, however, it is assumed that the total transmission power P has a constant value. A solution to the optimization problem, i.e. the signal noise power frequency for the subband k, is $$P(k) = \frac{P}{W} + \left(\frac{1}{K}\sum_l \frac{1}{\gamma(l)}\right) - \frac{1}{\gamma(k)},$$

wherein the sum applies over K subbands, covering the entire bandwidth W used. Since the optimization may sometimes lead to negative power for some subbands, it is possible to use the form $$P(k) = \max\left\{0, \frac{P}{W} + \left(\frac{1}{K}\sum_l \frac{1}{\gamma(l)}\right) - \frac{1}{\gamma(k)}\right\}$$

Instead of optimal capacity allocation, a suboptimal power distribution solution can be used: if the estimated channel is H(k) when power is transmitted distributed evenly over the frequency band, the capacity allocation can be suboptimally selected in the following manner:

$$P(k) = \alpha|H(k)|^2,$$

wherein a is a coefficient which scales the transmission power to the limits used in the transmission. In this alternative, the transmission power used on each subband is set directly according to the attenuation occurring on the channel.

When the invention is applied to CDMA or WCDMA systems wherein a common pilot signal is transmitted, the receiving transceiver estimates the frequency response of the channel by means of the common pilot signal. The transceiver further compares the frequency response determined for the data signal with the desired frequency response determined on the basis of the frequency response estimated by means of the common pilot signal, and, on the basis of the comparison, determines whether or not the frequency response used in the transmission of the data signal needs to be changed. The common pilot signal is transmitted using a fixed pulse-shaping filter, i.e. its power distribution within different frequency bands remains unchanged. In a preferred embodiment, the transmission of a data signal utilizes an adaptive pulse-shaping filter enabling the power distribution of the data signal to be adjusted within the frequency band.

FIG. 5 illustrates a preferred embodiment wherein data transfer utilizes frames. The figure shows three successive frames 500 to 504. If the frequency response is measured and modified at certain points of the frequency band, the information about the need to modify one point of the frequency band can be transmitted in a frame 500, and the information about the need to modify the next point can be transmitted in the next frame 502, etc. The information about the need to modify each point of the frequency band can be transmitted in successive frames. Even moderate capacity per frame will then suffice to transmit the information. In another alternative, the information about the need to modify each point of the frequency frame is transmitted simultaneously. In such a case, the information is transferred at a higher rate; consequently, the necessary amount of capacity is greater.

Information about the need to modify one point of the frequency band may be e.g. a mere command to increase or decrease the power, which can be indicated by means of one bit, for example. Alternatively, the magnitude of the change can also be indicated, or the absolute value as well; this, however, requires the highest amount of data transfer capacity.

Figure 7A:
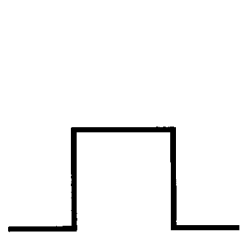
Figure 7B:
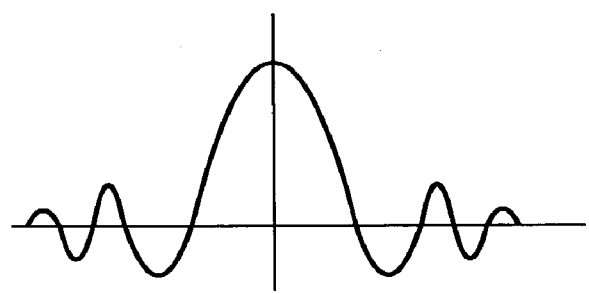

FIG. 6 illustrates an example of an apparatus according to a preferred embodiment. The figure shows a first transceiver 600, which may be e.g. a base transceiver station, and a second transceiver 602, which may be e.g. a subscriber terminal. The transceivers are transceivers in a CDMA or WCDMA system wherein different directions of transmission use different frequencies. It is to be noted that the figure does not show the transceivers in their entirety; only parts relevant to the invention are shown. The first transceiver 600 includes a common pilot signal generator 602. The transmission of the common pilot signal utilizes a fixed pulse shaper 604. The waveform of the signal to be transmitted by the pulse shaper is shaped to be more appropriate for the channel. This is illustrated in FIGS. 7A and 7B. Prior to the shaper, the signal is ideally a square wave (according to FIG. 7A) whose frequency response is infinite. In order to make the frequency response more appropriate for data transfer, the signal is modified by the pulse shaper to resemble e.g. the shape shown in FIG. 7B. The present example includes a raised cosine wave whose frequency response attenuates as the frequency moves further away from the medium frequency 700. The pulse shaper can preferably be implemented by an FIR (Finite Impulse Response) filter. The shaper 604 used in the transmission of the common pilot signal is a fixed one, i.e. the frequency response of the pilot signal is not varied during transmission.

The data signal to be transmitted is supplied to an adaptive pulse shaper 608, which thus enables the modification generated by the shaper to be adjusted. The pilot signal and the data signal are combined in an adder 610, and transmitted to a channel 615 through radio frequency parts 612 and an antenna 614.

The second transceiver 602 receives the signal from the channel 615 by an antenna 616, and the received signal is supplied to radio frequency parts 618. From the radio frequency parts, the signal is supplied to a fixed pulse shaper 620, at which a similar conversion to that conducted during transmission is carried out, only in a reverse direction. In reception, this embodiment thus utilizes a fixed pulse shaper, which corresponds with the shaper used in the transmission of the common pilot signal. The signal received from the shaper is supplied to a detector 622, at which data is detected, and from the detector, the signal is forwarded to other parts of the device (not shown).

The data signal and the common pilot signal are also supplied to an estimator 624, at which the frequency response of the data signal and the optimal frequency response are estimated. The estimated information is delivered to control means 626. The estimator and the control means can preferably be implemented e.g. by a processor and appropriate software or by means of separate components. The control means are used for determining a need for correction of the adaptive pulse shaper 608 used in the transmission, and for generating control information to be transmitted to the first transceiver, which information, together with a data signal 628 to be transmitted, is supplied to a fixed pulse shaper 630 to be used in the transmission. Several different alternatives that have already been described in connection with FIGS. 5 and 6 may be used for transmitting the control information. From the shaper, the signal is transmitted to the first transceiver 600 via radio frequency parts 632 and the antenna 616.

The first transceiver 600 receives the signal by the antenna 614 and radio frequency parts 634. From the radio frequency parts 634, the signal is supplied to a fixed pulse shaper 636, at which a similar conversion to that conducted during transmission is carried out, only in a reverse direction. From the shaper, the signal is supplied to a detector 638, at which the control bits transmitted by the second transceiver are detected and wherefrom the control bits are transmitted as control information to the adaptive pulse shaper 608 to be used in the transmission of the data signal.

At the estimator 624 of the second transceiver, the power spectrum of the received data signal can be estimated e.g. on the basis of the dedicated pilot signal or the entire data signal. The power spectrum also includes the effect of the pulse shaper used in the transmission. The frequency response at certain points can be determined by means of the FFT.

At a similar resolution, the second transceiver estimates the power spectrum of the channel by means of the common pilot signal. Since a fixed pulse shaper is used in the transmission of the pilot, the spectrum includes the effect of the channel only.

Control information can thus be preferably determined at certain points of the frequency band by comparing the responses estimated by means of the data signal and the common pilot with each other. The control information may include e.g. commands to raise or drop the power at certain points of the frequency band at an accuracy of 1 dB.

In an embodiment, the most appropriate from among a certain number of different available frequency response alternatives is selected for use in transmission. The control information may then include information as to which alternative is to be used.

In another embodiment, the second transceiver also uses adaptive pulse shaping in reception, which is adapted for the shaper used in transmission. The drawback herein is, however, that this is more complex to implement than the fixed shaper, particularly if the second transceiver is a portable terminal.

Although the invention has been described above with reference to the example according to the accompanying drawings, it is obvious that the invention is not restricted thereto but can be modified in many different ways within the scope of the inventive idea disclosed in the attached claims.

The invention claimed is:

1. A data transfer method between a first transceiver and a second transceiver, the data transfer comprising
transmitting a data signal from the first transceiver to the second transceiver in a broadband channel, measuring, at the second transceiver, the frequency response of the channel and the frequency response of the data signal from the received signal, comparing measurement results with each other, determining a need to change the frequency response of the data signal on the basis of the comparison, transmitting information about the need for change to the first transceiver, modifying, at the first transceiver, the frequency response of the data signal to be transmitted on the basis of the information.

2. A method as claimed in claim 1, wherein the frequency response is measured and modified at certain points of the frequency band, the data transfer utilizes frames, and that information about the need to modify one point of the frequency band is transmitted in one frame.

3. A method as claimed in claim 2, wherein information about the need to modify each point of the frequency band is transmitted in successive frames.

4. A method as claimed in claim 1, wherein the frequency response is measured and modified at certain points of the frequency band, and that the information about the need to modify each point of the frequency band is transmitted simultaneously.

5. A method as claimed in claim 1, further comprising:

determining, on the basis of the frequency response of the channel, a desired frequency response for the data signal, comparing the frequency response of the received data signal with the desired response, determining the need for change in the frequency response of the data signal on the basis of the comparison.

6. A data transfer system comprising a first and a second transceiver, wherein the first transceiver is arranged to transmit a data signal to the second transceiver in a broadband channel, and the second transceiver is arranged to receive the signal and measure the frequency response of the channel and the frequency response of the data signal from the received signal, compare measurement results with each other, determine a need for change in the frequency response of the data signal on the basis of the comparison, transmit information about the need for change to the first transceiver, and that the first transceiver is arranged to modify the frequency response of the data signal to be transmitted on the basis of the information.

7. A system as claimed in claim 6, wherein the second transceiver is arranged to measure the frequency response and the first transceiver is arranged to modify the frequency response at certain points of the frequency band, and that the data transfer between the transceivers utilizes frames, and that the second transceiver is arranged to transmit information about the need to modify one point in the frequency band in one frame.

8. A system as claimed in claim 7, wherein the second transceiver is arranged to transmit information about the need to modify each point of the frequency band in successive frames.

9. A system as claimed in claim 6, wherein the second transceiver is arranged to measure the frequency response and the first transceiver is arranged to modify the frequency response at certain points of the frequency band, and that the second transceiver is arranged to transmit the information about the need to modify each point of the frequency band simultaneously.

10. A transceiver, configured to receive a data signal from another transceiver in a broadband channel, measure the frequency response of the channel and the frequency response of the data signal from the received signal, compare the measurement results with each other, determine a need for change in the frequency response of the data signal on the basis of the comparison, and transmit information about the need for change to the other receiver.

11. A transceiver as claimed in claim 10, wherein data transfer between the transceivers utilizes frames and the transceiver is further configured to measure the frequency response at certain points of the frequency band and transmit information about the need to change one point in the frequency band in one frame.

12. A transceiver as claimed in claim 11, wherein the transceiver is configured to transmit information about the need to change each point of the frequency band in successive frames.

13. A transceiver as claimed in claim 10, wherein the transceiver is further configured to measure the frequency response at certain points of the frequency band, and to transmit the information about the need to change each point of the frequency band simultaneously.

14. A transceiver as claimed in claim 10, wherein the transceiver is further configured to determine, on the basis of the frequency response of the channel, a desired frequency response for the data signal, compare the frequency response of the received data signal with the desired response, and determine the need for change in the frequency response of the data signal on the basis of the comparison.

15. A transceiver, comprising:

means for receiving a data signal from another transceiver in a broadband channel, means for measuring the frequency response of the channel and the frequency response of the data signal from the received signal, means for comparing measurement results with each other, means for determining a need for change in the frequency response of the data signal on the basis of the comparison, and means for transmitting information about the need for change to the other receiver.

16. A method comprising:

receiving a data signal from a transceiver in a broadband channel, measuring the frequency response of the channel and the frequency response of the data signal from the received signal, comparing measurement results with each other, determining a need to change the frequency response of the data signal on the basis of the comparison, transmitting information about the need for change to the transceiver.

17. A method as claimed in claim 16, wherein the frequency response is measured and modified at certain points of the frequency band, the data transfer utilizes frames, and information about a need to modify one point of the frequency band is transmitted in one frame.

18. A method as claimed in claim 17, wherein information about the need to modify one point of the frequency band is transmitted in successive frames.

19. A method as claimed in claim 16, wherein the frequency response is measured at certain points of the frequency band, and information about a need to modify each point of the frequency band is transmitted simultaneously.

20. A method as claimed in claim 16, further comprising:
   determining, on the basis of the frequency response of the channel, a desired frequency response for the data signal,
   comparing the frequency response of the received data signal with the desired response,
   determining the need for change in the frequency response of the data signal on the basis of the comparison.

\* \* \* \* \*

UNITED STATES PATENT AND TRADEMARK OFFICE
CERTIFICATE OF CORRECTION

PATENT NO. : 7,424,061 B2  
APPLICATION NO. : 10/386250  
DATED : September 9, 2008  
INVENTOR(S) : Heikkilä

Page 1 of 1

It is certified that error appears in the above-identified patent and that said Letters Patent is hereby corrected as shown below:

On the Title Page:

References Cited Item (56), Other Publications: "for OFDM FOD Systems" should read --for OFDM FDD Systems--.

Col. 8, line 42: "wherein a is" should read --wherein α is--.

Signed and Sealed this

Sixth Day of January, 2009

JON W. DUDAS  
*Director of the United States Patent and Trademark Office*